UNITED STATES PATENT OFFICE

2,460,144

HYDROXYPHENYL ALKANOLAMINES

Maurice L. Moore and John R. Corrigan, Detroit, Mich., assignors to Sterling Drug Inc., New York, N. Y., a corporation of Delaware No Drawing. Application April 11, 1946, Serial No. 661,343

4 Claims. (Cl. 260—570.6)

This invention relates to (hydroxyphenyl)alkanolamines having the general formula

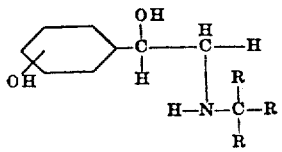

wherein R represents hydrogen or a lower-alkyl radical, and wherein at least two R groups are a lower-alkyl radical.

The (hydroxyphenyl)alkanolamines herein concerned are useful therapeutically as vasodepressors and bronchodilators. We have found that, by compounds of the above general formula, wherein the N-alpha-carbon is substituted by at least two lower-alkyl groups, a prolonged vasodepressor action is produced. This is in sharp contrast to other similar members of the (hydroxyphenyl)alkanolamines without branching on the N-alpha-carbon atom, which do not produce the same results therapeutically.

The compounds herein concerned may be produced by treating the corresponding (hydroxyphenyl)aminoalkyl ketone, with hydrogen, in the presence of a palladium catalyst, supported on carbon, by which reaction the (hydroxyphenyl)alkanolamines are produced in high yields. The reaction is conducted in the liquid phase, by dissolving a salt of the (hydroxyphenyl)aminoalkyl ketone in water and shaking the resulting solution, together with a small amount of palladium catalyst on carbon, in an atmosphere of hydrogen, in a pressure vessel, until at least about one equivalent of hydrogen is consumed. If the reaction becomes sluggish, additional catalyst may be introduced thereinto. The temperature for the reaction is between about 20 and 60 degrees centigrade, and preferably between about 25 and 50 degrees centigrade. When the reaction is complete, the pressure vessel is opened, the catalyst is removed by filtration, and the filtrate is concentrated. The concentrate is then made slightly alkaline and the 1-(hydroxyphenyl)-2-alkylaminoethanol separates as white crystals. If it is desired to produce a salt of the compound, the 1-(hydroxyphenyl)-2-alkylaminoethanol may be dissolved in hot alcohol and treated with dry hydrogen chloride, for example, whereupon the 1-(hydroxyphenyl)-2-alkylaminoethanol hydrochloride is obtained as white crystals.

The following example illustrates one method by which the members of the new group of compounds may be prepared, but is not to be construed as limiting.

Twenty-three grams (0.1 mole) of the hydrochloride salt of 1-(para-hydroxyphenyl)-1-keto-2-isopropylaminoethane was dissolved in 200 milliliters of hot distilled water, and 2 grams of 10 per cent palladium on carbon catalyst was added thereto. The hydrogenation was carried out at room temperature and under an initial hydrogen pressure of 60 pounds per square inch. Forty-five minutes was required to carry out the hydrogenation, at the end of which time the gauge pressure showed about one equivalent of hydrogen consumed. The palladium catalyst was removed by filtration, the filtrate was concentrated to one-half of its original volume, and the concentrate was made alkaline by the addition of 25 milliliters of concentrated ammonium hydroxide. The 1-(para-hydroxyphenyl)-1-hydroxy - 2 - isopropylaminoethane separated as white crystals, was filtered, washed with water, and dried. Sixteen and eight-tenths grams, representing a yield of 86 per cent of desired product, was recovered.

Nine and seventy-five hundredths grams (0.05 mole) of the 1-(para-hydroxyphenyl)-1-hydroxy-2-isopropylaminoethane obtained above was dissolved in 60 milliliters of hot absolute ethyl alcohol. A small quantity of charcoal (Darco) was added, and the solution was filtered. Dry hydrogen chloride was passed over the warm filtrate, with stirring, until the filtrate became slightly acid. Fifty milliliters of warm anhydrous ether was added to the acidified filtrate, whereafter it became slightly cloudy. The hydrochloride separated as white crystals and was further purified by washing with a fifty-fifty mixture of anhydrous ethyl alcohol and ethyl ether. The filtrate was further concentrated in volume, treated in a similar manner, and a total of 10.25 grams of 1-(para-hydroxyphenyl)-1-hydroxy - 2 - isopropylaminoethane hydrochloride was recovered. This represents a yield of 89 per cent.

Compounds within the scope of our invention which exhibit particular utility are 1-(para-hydroxyphenyl)-1-hydroxy - 2 - isopropylaminoethane, melting at 138–140 degrees centigrade, its hydrochloride, melting at 155–157 degrees centigrade, and its d-tartrate, melting with decomposition at 183–184 degrees centigrade; 1-(para-hydroxyphenyl)-1-hydroxy - 2 - (2-butylamino)-ethane, melting at 137–145 degrees centigrade, and the two diastereoisomers thereof, melting at 161–162 and 132.5–133 degrees centigrade; and 1-(para-hydroxyphenyl) - 1 - hydroxy - 2 - (tertiarybutylamino)ethane, melting at 172–173.5, and its hydrochloride which melts from 159-161 degrees centigrade. These compounds are useful therapeutically as vasodepressors and bronchodilators.

Other compounds within the scope of our invention which may be prepared according to the method previously given include 1-(meta-hydroxyphenyl)-1-hydroxy-2-(2-amylamino)-ethane, 1-(meta-hydroxyphenyl)-1-hydroxy-2-(2-hexylamino)-ethane, 1-(meta-hydroxyphenyl)-1-hydroxy-2-(2-heptylamino)-ethane, 1-(meta-hydroxyphenyl)-1-hydroxy-2-(2-(2-methyl)-butyl-amino)ethane, and 1-para-hydroxyphenyl)-1-hydroxy-2-(3-(3-methyl)heptylamino)ethane.

(Hydroxyphenyl)alkanolamine salts of many other acids may be produced in a manner similar to that given for the preparation of the hydrochloride. For example, the acetic, sulfuric, nitric, tartaric, citric, succinic, and hydrobromic acid salts, as well as many others, may readily be prepared from the free base.

The term "lower-alkyl" as employed in the appended claims means an alkyl radical containing from one to eight carbon atoms, and includes both straight and branched chain structures.

We claim:

1. A compound selected from the group consisting of (a) (hydroxyphenyl)alkanolamines having the general formula

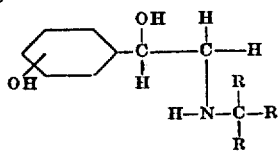

wherein R represents hydrogen or a lower-alkyl radical; and wherein at least two R groups are a lower-alkyl radical, and (b) salts thereof.

2. 1-(para - hydroxyphenyl)-1-hydroxy-2-isopropylaminoethane.

3. 1-(para-hydroxyphenyl)-1-hydroxy-2-(2-butylamino)-ethane.

4. 1-(para-hydroxyphenyl)-1-hydroxy-2-(tertiarybutylamino)-ethane.

MAURICE L. MOORE.
JOHN R. CORRIGAN.

REFERENCES CITED

The following references are of record in the file of this patent:

UNITED STATES PATENTS

| Number | Name | Date |
|---|---|---|
| 1,932,347 | Legerlotz | Oct. 24, 1933 |

OTHER REFERENCES

Konzett, Archi. exp. Path. Pharmakol., vol. 197, pages 27-56, Dec. 23, 1940.